US012266295B2

(12) United States Patent
Zhou et al.

(10) Patent No.: US 12,266,295 B2
(45) Date of Patent: Apr. 1, 2025

(54) DRIVING METHOD FOR GENERATING A SCANNING SIGNAL WITH PULSE WIDTH MODULATION BASED ON GRAY-SCALE VALUE, DRIVING DEVICE OF DISPLAY PANEL, AND DISPLAY DEVICE

(71) Applicant: HKC CORPORATION LIMITED, Shenzhen (CN)

(72) Inventors: Mancheng Zhou, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/383,052

(22) Filed: Oct. 24, 2023

(65) Prior Publication Data

US 2024/0071296 A1 Feb. 29, 2024

Related U.S. Application Data

(63) Continuation of application No. PCT/CN2022/143040, filed on Dec. 28, 2022.

(30) Foreign Application Priority Data

Jul. 26, 2022 (CN) ........................ 202210886690.X

(51) Int. Cl.
*G09G 3/32* (2016.01)

(52) U.S. Cl.
CPC ........... *G09G 3/32* (2013.01); *G09G 2310/06* (2013.01); *G09G 2320/0626* (2013.01)

(58) Field of Classification Search
CPC ........................................................ G09G 3/32
USPC ........................................................... 345/55
See application file for complete search history.

(56) References Cited

U.S. PATENT DOCUMENTS

2007/0001991 A1* 1/2007 Jang ....................... G11C 19/28 345/100
2008/0007512 A1 1/2008 Honbo
2011/0012932 A1* 1/2011 Morimoto ................ G09G 3/20 345/690

(Continued)

FOREIGN PATENT DOCUMENTS

CN 101105920 A 1/2008
CN 101673513 A 3/2010

(Continued)

OTHER PUBLICATIONS

Notification to Grant Patent Right for Invention, Chinese Application No. 202210886690.X, mailed Sep. 30, 2022 (8 pages).

(Continued)

*Primary Examiner* — Long D Pham

(57) ABSTRACT

A driving method and a driving device of a display panel, and a display device are provided. The driving method includes: receiving a video signal transmitted by an external processor; transmitting a first scanning signal to a current row of pixels in response to a first gray-scale value of each of the current row of pixels of the display panel corresponding to the video signal being greater than a preset gray-scale value; transmitting a second scanning signal to a next row of pixels of the display panel; and transmitting, based on the first gray-scale value, a data signal to the display panel and driving the display panel to display the video signal.

20 Claims, 8 Drawing Sheets

(56) References Cited

U.S. PATENT DOCUMENTS

| | | | | |
|---|---|---|---|---|
| 2019/0027084 | A1 | 1/2019 | Lee et al. | |
| 2020/0357346 | A1* | 11/2020 | Pyun | G09G 3/3266 |
| 2021/0035504 | A1 | 2/2021 | Lee et al. | |

FOREIGN PATENT DOCUMENTS

| | | | |
|---|---|---|---|
| CN | 110277052 | A | 9/2019 |
| CN | 110383161 | A | 10/2019 |
| CN | 110648637 | A | 1/2020 |
| CN | 111161670 | A | 5/2020 |
| CN | 111312159 | A | 6/2020 |
| CN | 111489685 | A | 8/2020 |
| CN | 113450704 | A | 9/2021 |
| CN | 114141210 | A | 3/2022 |
| CN | 114550644 | A | 5/2022 |
| CN | 115083339 | A | 9/2022 |
| JP | 2003066922 | A | 3/2003 |
| JP | 2011227374 | A | 11/2011 |
| WO | 2022021123 | A1 | 2/2022 |

OTHER PUBLICATIONS

International Search Report,International Application No. PCT/CN2022/143040, mailed Apr. 19, 2023 (16 pages).

Korean Request for the Submission of an Opinion 1 , Korean Application No. 10-2024-7019991 , mailed Dec. 16, 2024(5 pages).

* cited by examiner

DRIVING METHOD FOR GENERATING A SCANNING SIGNAL WITH PULSE WIDTH MODULATION BASED ON GRAY-SCALE VALUE, DRIVING DEVICE OF DISPLAY PANEL, AND DISPLAY DEVICE

CROSS REFERENCE TO RELATED APPLICATIONS

The present disclosure is a continuation of International Patent Application No. PCT/CN2022/143040, filed Dec. 28, 2022, which claims the priority of Chinese Patent Application NO. 202210886690.X filed Jul. 26, 2022, the contents of both of which are herein incorporated by reference in their entireties.

TECHNICAL FIELD

The present disclosure relates to the field of display panel technologies, and in particular to a driving method and a driving device of a display panel, and a display device.

BACKGROUND

As a pixel arrangement in a display panel develops in a direction of small spacing, a light emitting diode (LED) display screen has put forward a higher requirement for row driving, namely, from a simple p-type Metal-Oxide-Semiconductor Field-Effect Transistor (P-MOSFET) for achieving row switching to a multi-functional row driving with a higher integration and a stronger function. For example, when one of data signals for a controlling row, i.e., a data signal Row (n+1), is low, a voltage on a row line, namely, an anode voltage of a LED lamp located in the controlling row, may be pulled up. However, data Out (m) of a column tube, that is, a cathode voltage of the LED lamp may be displayed, and different brightness of the LED lamp may be correspondingly obtained based on a width of a waveform with an Out (m) of low voltage.

The width of the waveform with the Out (m) of low voltage is controlled by a pulse width modulation (PWM) signal corresponding to a global clock (GCLK) signal. The PWM signal corresponds to a gray scale of a display frame. For example, one GCLK period represents a pulse width of a gray scale 1, two GCLK periods represent a pulse width of a gray scale 2, and three GCLK periods represent a pulse width of a gray scale 3. That is, the pulse width of the gray scale 2 is twice that of the gray scale 1, and the pulse width of the gray scale 3 is three times that of the gray scale 1. For an architecture using the PWM for the gray scale, the gray scale is only related to the GCLK, and the number of GCLKs in one row is an upper limit of the gray scale. A refresh rate is defined as the number of times that the LED lamp is turned on/off in one second. For example, the LED lamp is turned on/off m times in one second, the pulse width appears m times, and the refresh rate is mHz. For a high gray scale, the Out (m) displayed by the PWM may be very wide, that is, the greater the brightness required, the wider the width of the PWM required. If a scattering function is added, the refresh rate will be multiplied. In addition, according to the analysis of an application scenario of a LED display screen, the high gray scale is usually applied widely. This is because most of LED display screens are outdoor large screens, a viewing distance of the outdoor large screen is much longer than that of a LED display screen in an indoor household, and it may be conducive to improve the display quality by increasing the refresh rate.

However, for the display with a high gray scale, for example, when a gray-scale value is greater than a scattering number, the refresh rate may be fixed. Therefore, it may be impossible to increase the refresh rate again, and thus it may restrict the display panel to continue to improve a display effect in the high gray scale.

SUMMARY OF THE DISCLOSURE

According to a first aspect of the embodiments of the present disclosure, a driving method of a display panel is provided. The display panel includes a plurality of pixels arranged in an array. The driving method includes: receiving a video signal transmitted by an external processor; transmitting a first scanning signal to a current row of pixels in response to a first gray-scale value of each of the current row of pixels of the display panel corresponding to the video signal being greater than a preset gray-scale value; transmitting a second scanning signal to a next row of pixels of the display panel; and transmitting, based on the first gray-scale value, a data signal to the display panel and driving the display panel to display the video signal. The first scanning signal is a high level in a current-row scanning period and has a high level with a first time width in a next-row scanning period, the second scanning signal is a high level in the next-row scanning period, the data signal has a low level with a second time width in the current-row scanning period, and a sum of the first time width and the second time width corresponds to the first gray-scale value.

According to a second aspect of the embodiments of the present disclosure, a driving device of a display panel is provided. The display panel includes a plurality of pixels arranged in an array. The driving device includes: a control unit, coupled to an external processor, and configured to receive a video signal transmitted by the external processor and generate a first control signal in response to a first gray-scale value of each of a current row of pixels of the display panel corresponding to the video signal being greater than a preset gray-scale value; and a driving unit, coupled to the control unit and an external display panel, and configured to receive the first control signal and the first gray-scale value transmitted by the control unit, transmit, based on the first control signal, a first scanning signal to the current row of pixels, transmit the second scanning signal to a next row of pixels of the display panel, and transmit, based on the first gray-scale value, a data signal to the display panel and drive the display panel to display the video signal; the first scanning signal is a high level in a current-row scanning period and has a high level with a first time width in a next-row scanning period, the second scanning signal is a high level in the next-row scanning period, the data signal has a low level with a second time width in the current-row scanning period, and a sum of the first time width and the second time width corresponds to the first gray-scale value.

According to a third aspect of the embodiments of the present disclosure, a display device is provided. The display device includes a display panel, including a plurality of pixels arranged in an array; and a driving device, coupled to the display panel and configured to drive a light-emitting unit of the display panel to emit light; the driving device includes: a control unit, coupled to an external processor, and configured to receive a video signal transmitted by the external processor and generate a first control signal in response to a first gray-scale value of each of a current row of pixels of the display panel corresponding to the video signal being greater than a preset gray-scale value; and a driving unit, coupled to the control unit and an external display panel, and configured to receive the first control signal and the first gray-scale value transmitted by the control unit, transmit, based on the first control signal, a first scanning signal to the current row of pixels, transmit the second scanning signal to a next row of pixels of the display panel, and transmit, based on the first gray-scale value, a data signal to the display panel and drive the display panel to display the video signal. The first scanning signal is a high level in a current-row scanning period and has a high level with a first time width in a next-row scanning period, the second scanning signal is a high level in the next-row scanning period, the data signal has a low level with a second time width in the current-row scanning period, and a sum of the first time width and the second time width corresponds to the first gray-scale value.

BRIEF DESCRIPTION OF THE DRAWINGS

In order to illustrate the technical solutions more clearly in the embodiments of the present disclosure, the following will be briefly described in the description of the embodiments required to use the attached drawings. It is obvious that the following description of the attached drawings are only some of the embodiments of the present disclosure, and those skilled in the art, without creative work, can also obtain other attached drawings based on these drawings.

REFERENCE NUMERALS IN DRAWINGS

40/70/82, driving device; 41/71, control unit; 42/72, driving unit; 50, external processor; 60/81, display panel; 711, timing controller; 712, brightness detection unit; 721, row driving unit; 722, column driving unit; 80, display device.

DETAILED DESCRIPTION

In order to illustrate the technical problems solved, the technical solutions adopted, and the technical effects achieved by some embodiments of the present disclosure more clearly, the technical solutions in the embodiments of the present disclosure will be further described in detail below in conjunction with the accompanying drawings.

The term "embodiments" may indicate that a particular feature, a structure or a property described in one embodiment may be included in at least one embodiment of the present disclosure. Presence of the term in various sections in the specification does not necessarily mean a same embodiment or a separate or an alternative embodiment that is mutually exclusive with other embodiments. It shall be understood, both explicitly and implicitly, by any ordinary skilled person in the art that the embodiments described herein may be combined with other embodiments.

Figure 1:
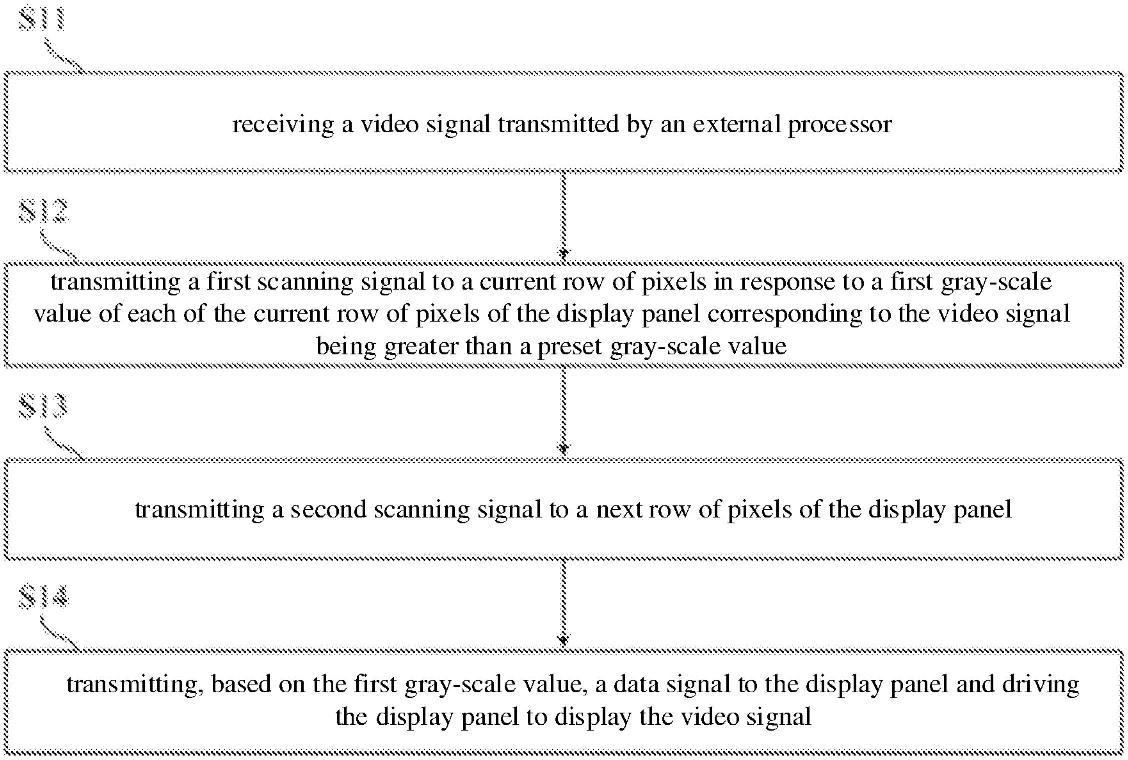
FIG. 1 is a flow chart of a driving method of a display panel according to a first embodiment of the present disclosure.

As shown in FIG. 1, FIG. 1 is a flow chart of a driving method of a display panel according to a first embodiment of the present disclosure. In the embodiment, the driving method includes operations executed by the following blocks.

At block S11, a video signal transmitted by an external processor is received.

It should be understood that, the driving method in the embodiment is a method for driving a light-emitting unit of the display panel through a driving assembly, so that the light-emitting unit correspondingly displays a video signal transmitted by a processor to the driving assembly.

In some embodiments, the display panel includes a plurality of pixels arranged in an array, that is, the display panel correspondingly includes a plurality of rows of pixels. In response to the driving assembly receiving the video signal transmitted by the external processor, the driving assembly may transmit a corresponding driving signal to each pixel to display the video signal.

It should be noted that the processor may refer to a central processing unit of the corresponding display device outside the display panel.

At block S12, a first scanning signal is transmitted to a current row of pixels in response to a first gray-scale value of each of the current row of pixels of the display panel corresponding to or for the video signal being greater than a preset gray-scale value.

It should be understood that, after the driving assembly receives the video signal transmitted by the processor, the driving assembly may analyze the video signal and determine a gray scale of each pixel of the display panel corresponding to or for the video signal.

In some embodiments, when the driving assembly determines that the first gray-scale value of the each of the current row of pixels of the display panel corresponding to or for a currently received video signal is greater than the preset gray-scale value, the driving assembly may transmit the first scanning signal to the current row of pixels.

It should be noted that, the current row of pixels refers to the pixel at a row which is being scanned at a current time point, and may be corresponding to any one row of pixels in the display panel.

The preset gray-scale value may correspond to scattering times of a pulse width modulation (PWM) signal preset by the driving assembly. In some embodiments, the preset gray-scale value may be any other reasonable value such as 32 or 64, which is not limited herein.

At block S13, a second scanning signal is transmitted to a next row of pixels of the display panel.

In some embodiments, the driving assembly continues to transmit the second scanning signal to the next row of pixels of the display panel.

At block S14, based on the first gray-scale value, a data signal is transmitted to the display panel, and the display panel is driven to display the video signal.

It should be understood that, after the driving assembly determines the gray scale of each pixel of the display panel corresponding to the video signal, the driving assembly may correspondingly analyze a corresponding PWM signal of the data signal transmitted to each column of pixels, or directly receive the PWM signal correspondingly transmitted by the external processor. A gray scale 1 corresponds to a period of one GCLK, a gray scale 2 corresponds to a period of two GCLKs, a gray scale 3 corresponds to a period of three GCLKs, and so on sequentially. In this way, after the first gray-scale value is determined, the PWM signal corresponding to the data signal to be transmitted may be obtained.

In some embodiments, after the driving assembly determines the first gray-scale value of the each of the current row of pixels, the driving assembly may correspondingly analyze the PWM signal and determine a transmission mode of a high level state and a low level state of the data signal according to the PWM signal, transmit the data signal to the display panel, and drive the display panel to display the video signal.

Figure 2:
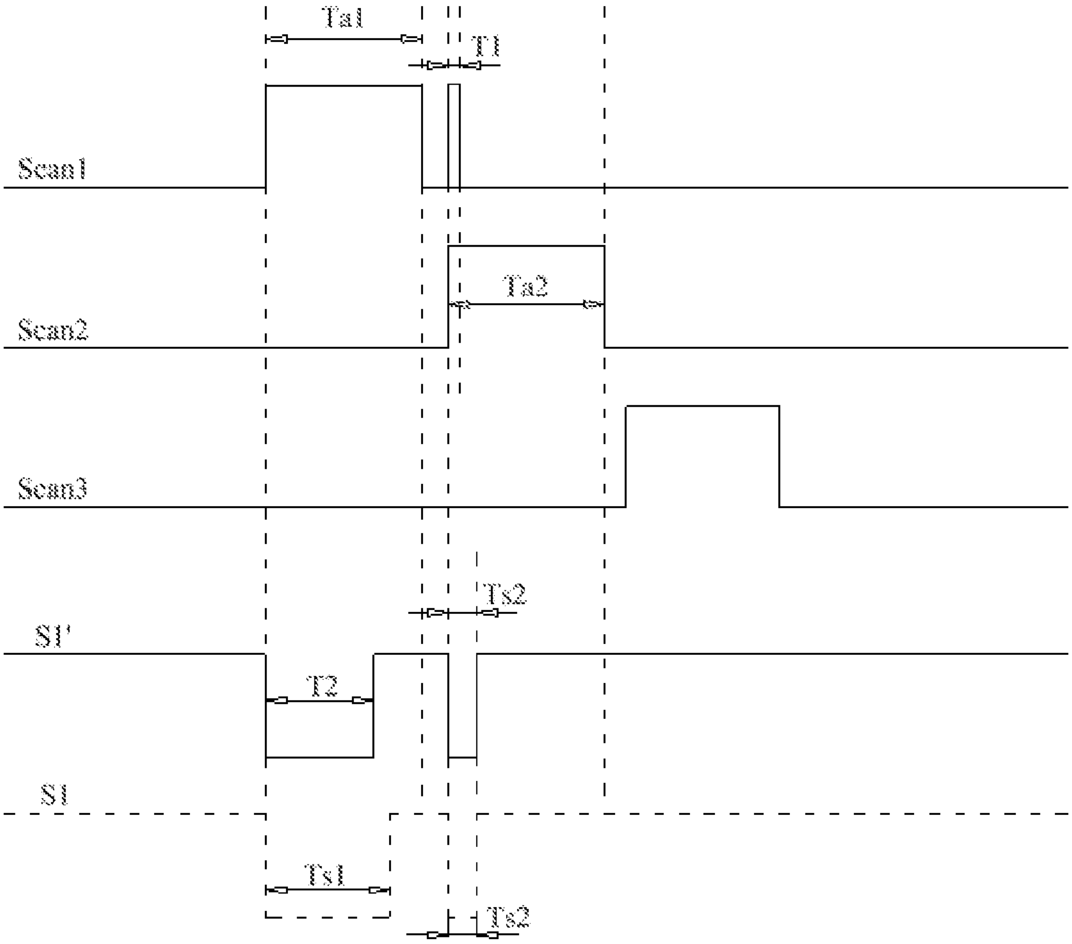
FIG. 2 is a corresponding signal waveform view of the driving method of the display panel shown in FIG. 1 in an application scenario.

To facilitate understanding, a case, in which the first gray-scale value is greater than the preset gray-scale value, a pulse width of a PWM signal corresponding to the first gray-scale value is Ts1, a second gray-scale value of each of the next row of pixels of the display panel corresponding to the video signal is less than the preset gray-scale value, and a pulse width of a PWM signal corresponding to the second gray-scale value is Ts2, is taken to be as an example. As shown in FIG. 2, FIG. 2 is a corresponding signal waveform view of the driving method of the display panel shown in FIG. 1 in an application scenario. Scant shown in FIG. 2 corresponds to a waveform view of the first scanning signal, Scan2 corresponds to a waveform view of the second scanning signal, and Scan3 corresponds to a waveform view of a third scanning signal transmitted by the driving device to a further next row of pixels (i.e., a next row of the next row of pixels). S1 is a waveform view of a data signal transmitted to the display panel corresponding to the driving device according to a conventional embodiment, and S1' is a waveform view of a data signal transmitted to the display panel based on the first gray-scale value according to an embodiment of the present disclosure. In some embodiments, the current row may be a nth row, the next row may be a (n+1)th row, and the further next row may be a (n+2)th row.

It can be seen that the first scanning signal is a high level in a current-row scanning period (i.e., a scanning period of the current row) Ta1. The first scanning signal has a high level with a first time width T1 in a next-row scanning period (i.e., a scanning period of the next row) Ta2. The second scanning signal is a high level in the next-row scanning period Ta2. The data signal has a low level with a second time width T2 in the current-row scanning period Ta1, and a sum of the first time width T1 and the second time width T2 corresponds to the first gray-scale value, that is, T1+T2=Ts1.

In some embodiments, the first time width (i.e., duration width) T1 may be a time width corresponding to or for a gray-scale value of 1, that is, the first time width T1 corresponds to a pulse width of a global clock. In other embodiments, the first time width T1 may also be any reasonable time width less than a pulse width Ts2 of the PWM signal, which is not limited herein.

The PWM signal Ts1 corresponding to the first gray-scale value is divided into two parts, so as to light up a current row of pixels in the current-row scanning period Ta1 and a current row of pixels in the next-row scanning period Ta2. In this way, a refresh rate corresponding to a current row of pixels may be doubled, and thus the purpose of increasing the refresh rate may be achieved.

In the above-mentioned technical solution, a gray-scale modulation pulse width corresponding to the data signal is divided into two parts, and a corresponding pixel corresponding to the current-row scanning period (i.e., the current row of pixels) and a corresponding pixel corresponding to the next-row scanning period (i.e., the next row of pixels) are lighted up, respectively. In this way, the high gray scale may be effectively improved, that is, the high gray scale is larger than the refresh rate in the display scenario with the preset gray-scale value, thereby effectively improving the high gray scale of the display image quality.

In some embodiments, after the above-mentioned block S11 and before the above-mentioned block S12, the driving method further includes: analyzing the video signal and obtaining the first gray-scale value of the each of the current row of pixels of the display panel corresponding to the video signal.

It should be understood that, after obtaining the video signal, the driving assembly of the display panel may obtain the first gray-scale value of the each of the current row of pixels by analyzing the video signal.

Figure 3:
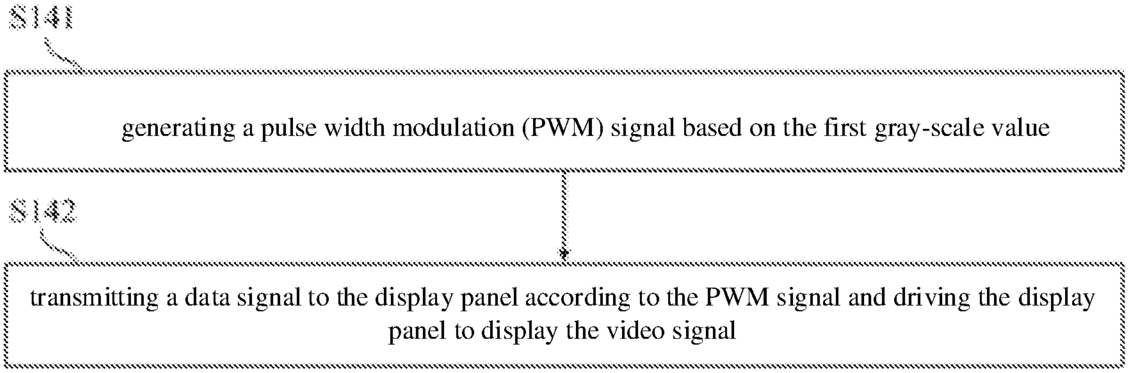
FIG. 3 is a flow chart of a block S14 shown in FIG. 1 corresponding to an embodiment.

As shown in FIG. 3, FIG. 3 is a flow chart of a block S14 shown in FIG. 1 corresponding to an embodiment. In an embodiment, the above-mentioned block S14 may further include operations executed by the following blocks.

At block S141, a PWM signal is generated based on the first gray-scale value.

It should be understood that, after the driving assembly determines the gray scale of each pixel of the display panel corresponding to the video signal, the driving assembly may correspondingly analyze a PWM signal corresponding to or for the data signal transmitted to the each column of pixels. The gray scale 1 corresponds to the period of one GCLK, the gray scale 2 corresponds to the period of two GCLKs, the gray scale 3 corresponds to the period of three GCLKs, and so on sequentially. In this way, after the first gray-scale value is determined, the PWM signal corresponding to or for the data signal to be transmitted may be obtained.

At block S142, a data signal is transmitted to the display panel according to or by using the PWM signal, and the display panel is driven to display the video signal.

In some embodiments, the transmission mode of the high level state and a low level state of the data signal is determined according to the PWM signal. Based on the transmission mode, the data signal is transmitted to the display panel, such that the data signal has a corresponding high level state and a corresponding low level state to drive the display panel to display the video signal.

In another embodiment, the above-mentioned block S141 may also be replaced by: receiving the PWM signal transmitted by the processor.

It should be understood that, a processing program configured to analyze the PWM signal from the first gray-scale value is integrated on the processor, such that the amount of calculating and processing data of the driving assembly may be effectively reduced, thereby improving the processing efficiency of the display panel.

Figure 4:
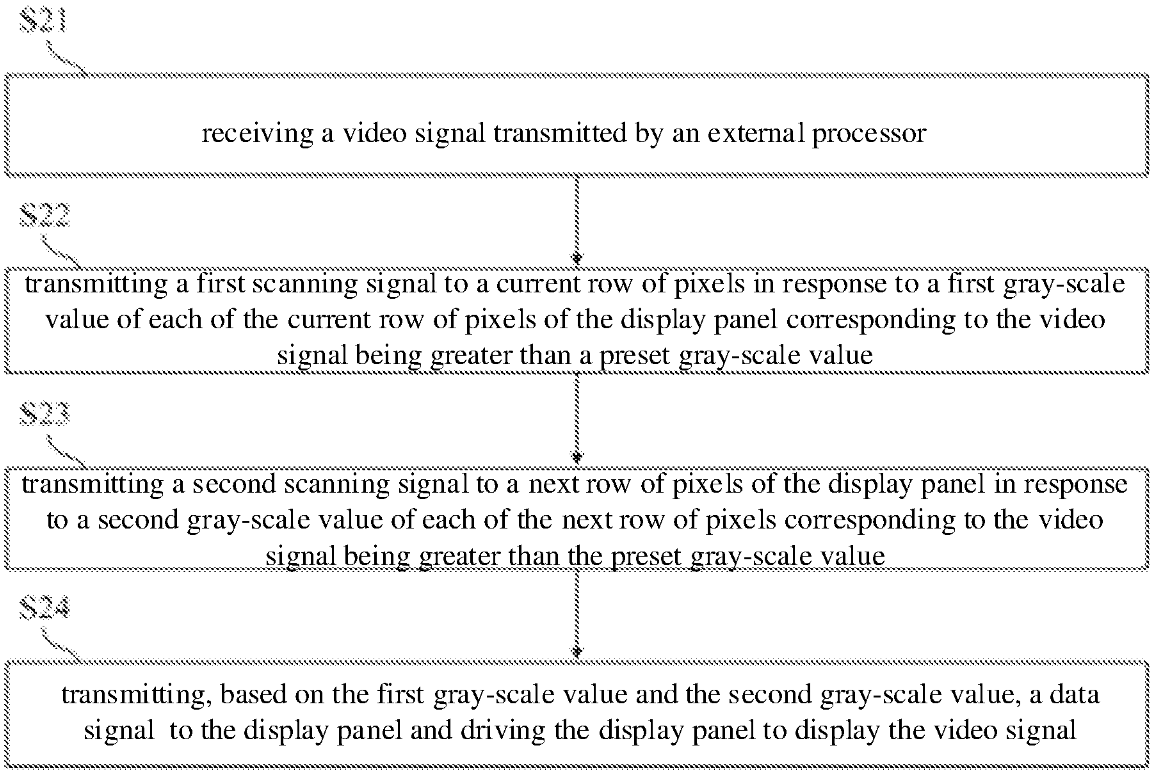
FIG. 4 is a flow chart of the driving method of the display panel according to a second embodiment of the present disclosure.

As shown in FIG. 4, FIG. 4 is a flow chart of the driving method of the display panel according to a second embodiment of the present disclosure. The driving method of the display panel according to the embodiment of the present disclosure is a flow chart of a detailed embodiment of the driving method of the display panel shown in FIG. 1, and includes operations executed by the following blocks.

At block S21, the video signal transmitted by the external processor is received.

At block S22, the first scanning signal is transmitted to the current row of pixels in response to the first gray-scale value of the each of the current row of pixels of the display panel corresponding to the video signal being greater than the preset gray-scale value.

The block S21 and the block S22 are the same as the block S11 and the block S12 shown in FIG. 1, respectively, which may refer to S11 and S12 and the relevant description above, and will not be repeated herein.

At block S23, the second scanning signal is transmitted to the next row of pixels in response to the second gray-scale value of the each of the next row of pixels corresponding to the video signal being greater than the preset gray-scale value.

It should be understood that, in a case that the driving assembly determines that the second gray-scale value of the each of the next row of pixels corresponding to the currently received video signal is also greater than the preset gray-scale value, the driving assembly may transmit the second scanning signal to the next row of pixels. At this time, the second scanning signal may also have a high level with a corresponding pulse width corresponding to the current-row scanning period.

At block S24, based on the first gray-scale value and the second gray-scale value, a data signal is transmitted to the display panel, and the display panel is driven to display the video signal.

In some embodiments, based on the first gray-scale value and the second gray-scale value, the driving assembly may transmit the data signal to the display panel and drive the display panel to display the video signal.

Figure 5:
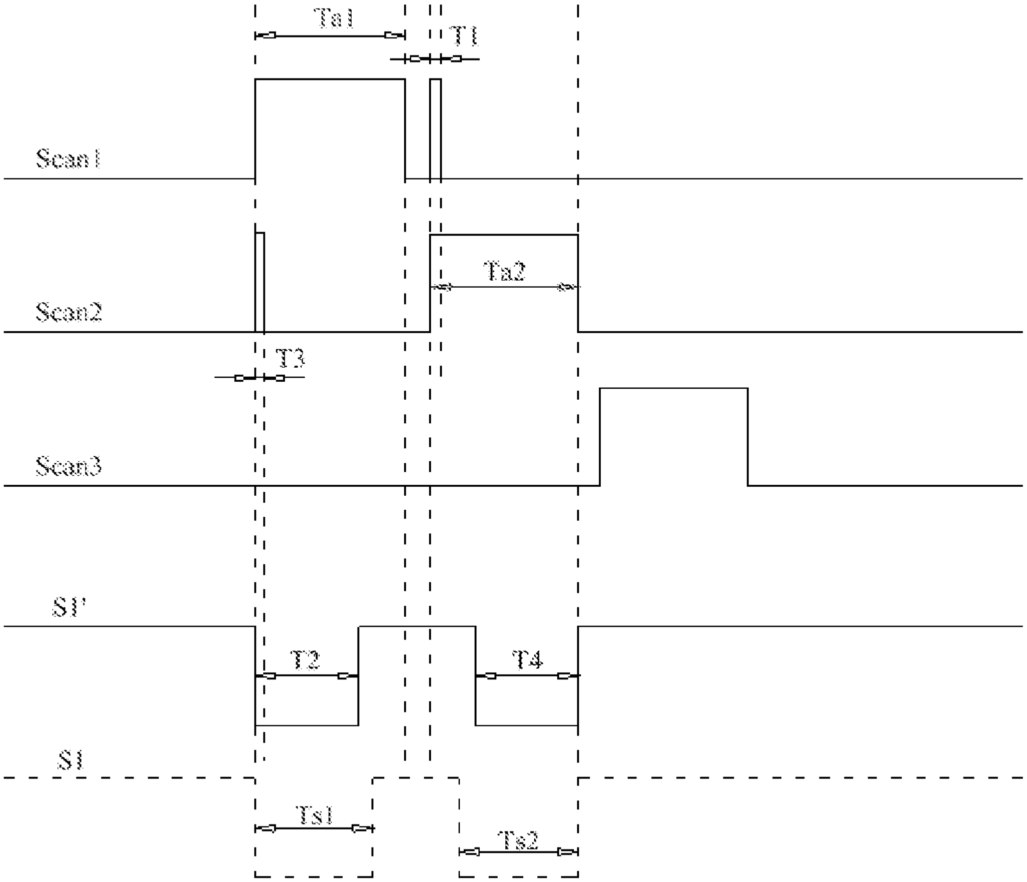
FIG. 5 is a corresponding signal waveform view of the driving method of the display panel shown in FIG. 4 in an application scenario.

To facilitate understanding, in the embodiment, the case, in which the first gray-scale value is greater than the preset gray-scale value, a pulse width of a gray scale PWM signal corresponding to the first gray-scale value is Ts1, the second gray-scale value of the each of the next row of pixels of the display panel corresponding to the video signal is also greater than the preset gray-scale value, and a pulse width of a gray scale PWM signal corresponding to the second gray-scale value is Ts2, is taken to be as an example. As shown in FIG. 5, FIG. 5 is a corresponding signal waveform view of the driving method of the display panel shown in FIG. 4 in an application scenario. Scant shown in FIG. 5 corresponds to a waveform view of the first scanning signal, Scan2 corresponds to a waveform view of the second scanning signal, and Scan3 corresponds to a waveform view of the third scanning signal transmitted by the driving device to the further next row of pixels. S1 is a waveform view of a data signal transmitted to the display panel corresponding to the driving device according to a conventional embodiment, and S1' is a waveform view of a data signal transmitted to the display panel based on the first gray-scale value according to an embodiment of the present disclosure.

It can be seen that the second scanning signal further has a high level with a third time width T3 in the current-row scanning period Ta1, and the data signal has a low level with a fourth time width T4 in the next-row scanning period Ta2. The third time width T3 is less than the second time width T2. A sum of the third time width T3 and the fourth time width T4 corresponds to the second gray-scale value, that is, T3+T4=Ts2.

In some embodiments, the first time width T1 is further less than the fourth time width T4.

Figure 6:
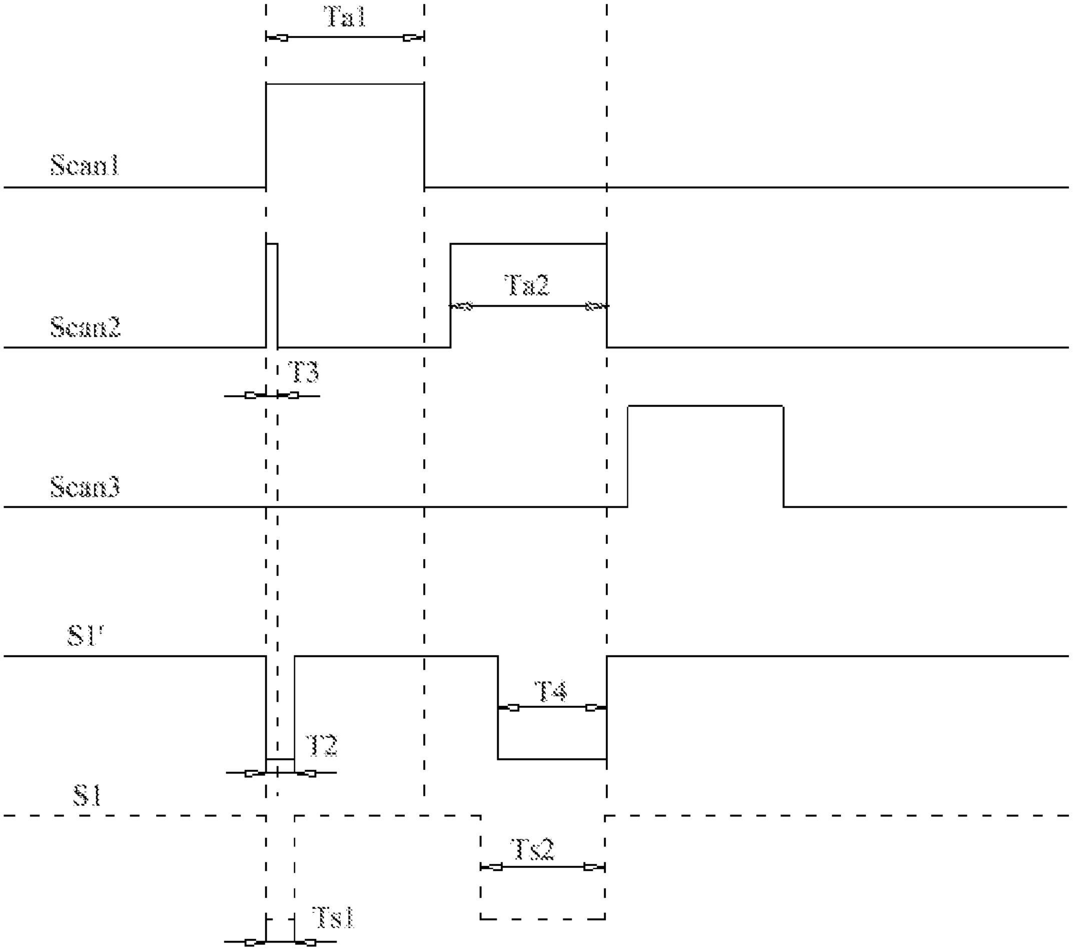
FIG. 6 is a corresponding signal waveform view of the driving method of the display panel shown in FIG. 4 in another application scenario.

In some embodiments, the case, in which the first gray-scale value is greater than the preset gray-scale value, the pulse width of the gray scale PWM signal corresponding to the first gray-scale value is Ts1, the second gray-scale value of the each of the next row of pixels of the display panel corresponding to the video signal is also greater than the preset gray-scale value, and the pulse width of the gray scale PWM signal corresponding to the second gray-scale value is Ts2, is taken to be as an example. As shown in FIG. 6, FIG. 6 is a corresponding signal waveform view of the driving method of the display panel shown in FIG. 4 in another application scenario. At this time, the sum of the third time width T3 and the fourth time width T4 corresponds to the second gray-scale value, that is, T3+T4=Ts2.

In addition, the second time width T2 corresponds to the first gray-scale value, namely, T2=Ts1. The third time width T3 is less than the second time width T2.

In some embodiments, after the above-mentioned block S23 and before the above-mentioned block S24, the driving method may further include: transmitting the third scanning signal to the further next row of pixels of the display panel.

Figure 7:
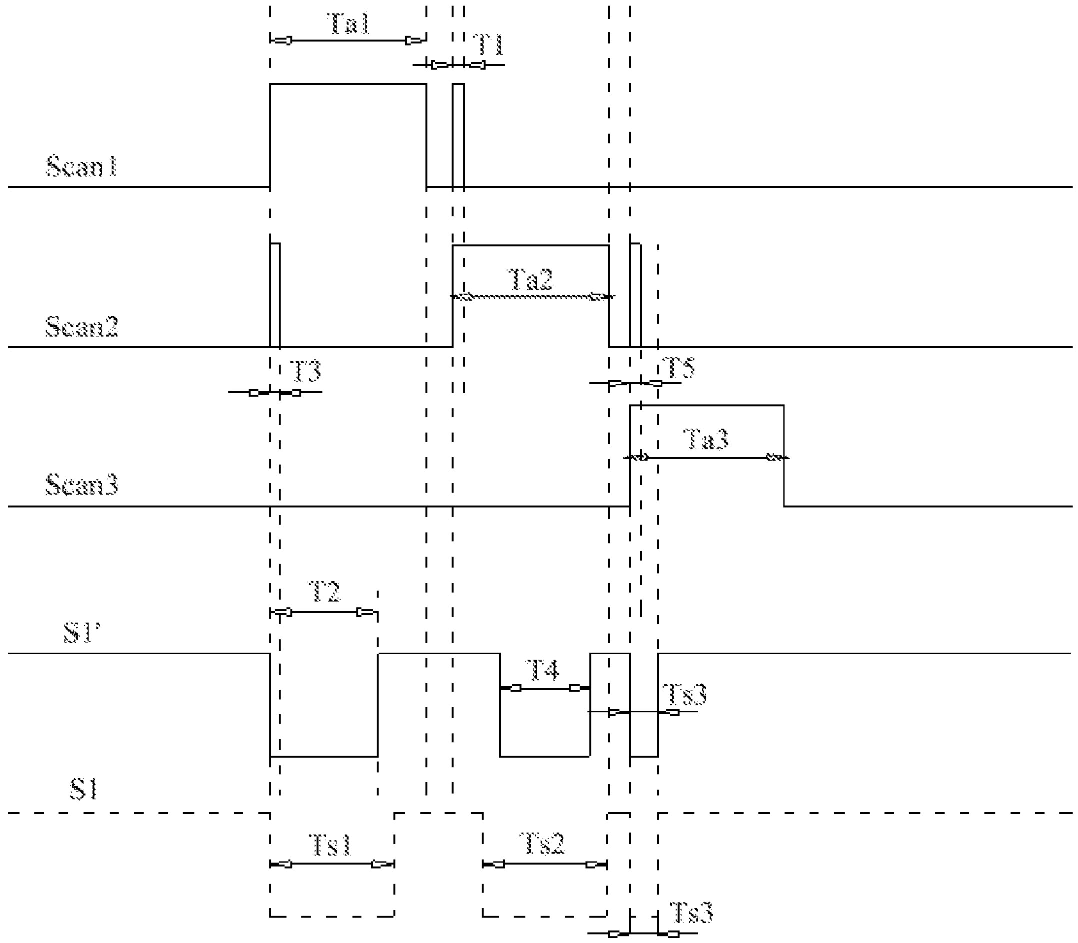
FIG. 7 is a corresponding signal waveform view of the driving method of the display panel shown in FIG. 1 in yet another application scenario.

It should be understood that, in an embodiment, when the first gray-scale value is greater than the preset gray-scale value, the pulse width of the gray scale PWM signal corresponding to the first gray scale is Ts1, the second gray-scale value of the each of the next row of pixels of the display panel corresponding to the video signal is also greater than the preset gray-scale value, and the pulse width of the gray scale PWM signal corresponding to the second gray scale is Ts2. In addition, the third gray-scale value corresponding to the further next row of pixels of the display panel is less than the preset gray-scale value, and a pulse width of a gray scale PWM signal corresponding to the third gray scale is Ts3. As shown in FIG. 7, FIG. 7 is a corresponding signal waveform view of the driving method of the display panel shown in FIG. 1 in yet another application scenario. At this time, the second scanning signal has a high level with a fifth time width T5 in a further next-row scanning period Ta3. A sum of the third time width T3, the fourth time width T4, and the fifth time width T5 corresponds to the second gray-scale value, that is, T3+T4+T5=Ts2.

In addition, the sum of the first time width T1 and the second time width T2 corresponds to the first gray-scale value, that is, T1+T2=Ts1. The third time width T3 is less than the second time width T2.

Figure 8:
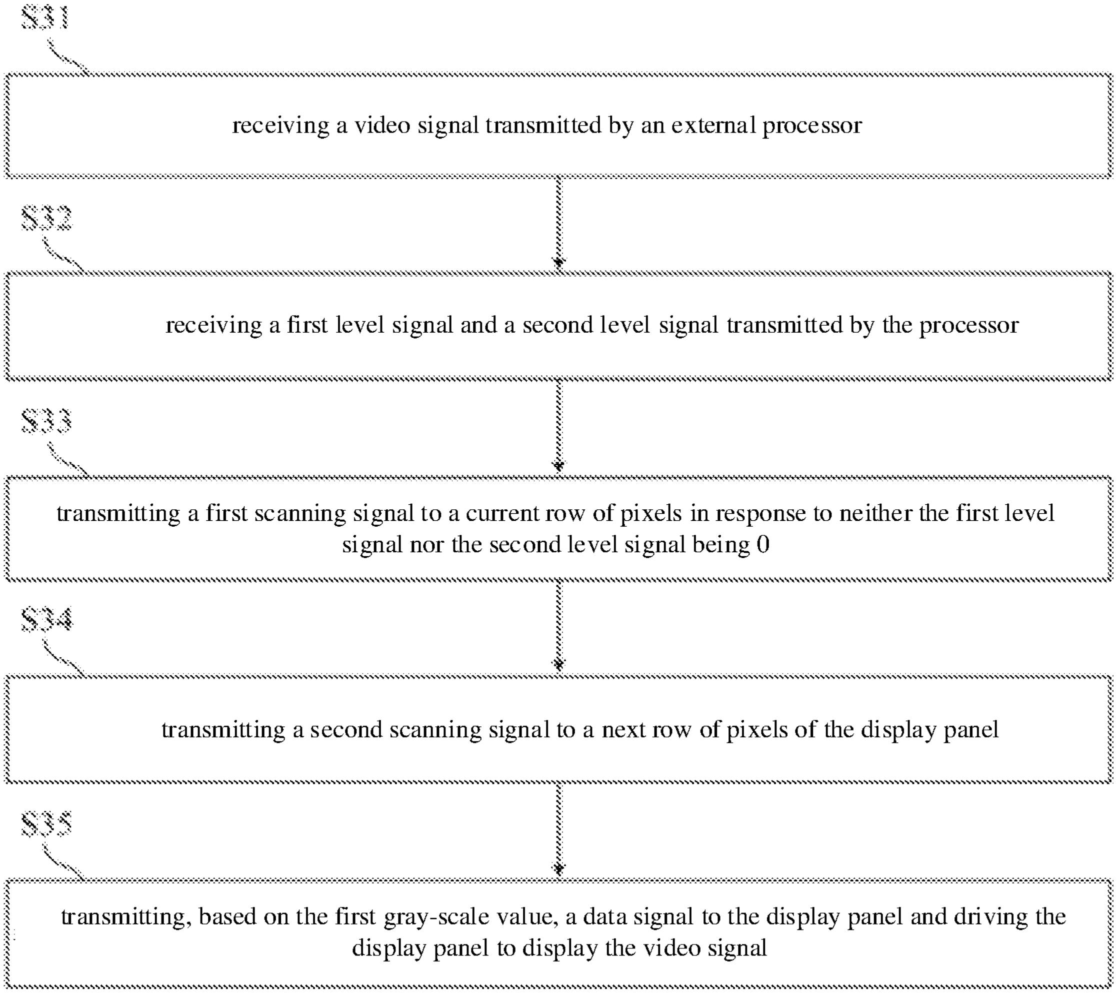
FIG. 8 is a flow chart of the driving method of the display panel according to a third embodiment of the present disclosure.

As shown in FIG. 8, FIG. 8 is a flow chart of the driving method of the display panel according to a third embodiment of the present disclosure. The driving method of the display panel according to the embodiment of the present disclosure is a flow chart of a detailed embodiment of the driving method of the display panel shown in FIG. 1, and includes operations executed by the following blocks.

At block S31, the video signal transmitted by the external processor is received.

The block S31 is the same as the block S11 shown in FIG. 1, which may refer to the block S11 and the relevant description above, and will not be repeated herein.

At block S32, a first level signal and a second level signal transmitted by the processor are received.

It should be understood that, a driving control signal may also be served as a prerequisite to determine whether the first grayscale value of each of the current row of pixels of the display panel corresponding to the currently received video signal is greater than the preset gray-scale value via a logic level signal transmitted by the processor and received by the driving control signal. For example, when the first level signal and the second level signal received by the driving control signal are 1, it is determined that the first gray-scale value of the each of the current row of pixels of the display panel corresponding to the currently received video signal is greater than the preset gray-scale value. When the first level signal and the second level signal received by the driving control signal are 0, it is determined that the first gray-scale value of the each of the current row of pixels of the display panel corresponding to the currently received video signal is not greater than, i.e., or less than or equal to, the preset gray-scale value.

At block S33, the first scanning signal is transmitted to the current row of pixels in response to neither the first level signal nor the second level signal being 0.

In some embodiments, based on a determination that neither the first level signal nor the second level signal is 0, it is determined that the first gray-scale value of the each of the current row of pixels of the display panel corresponding to the currently received video signal is greater than the preset gray-scale value, and it is necessary to transmit the first scanning signal to the current row of pixels.

In addition, the first scanning signal is a high level in the current-row scanning period Ta1, and has a high level with the first time width T1 in the next-row scanning period Ta2. The second scanning signal is a high level in the next-row scanning period Ta2. The data signal has a low level with the second time width T2 in the current-row scanning period Ta1, and the sum of the first time width T1 and the second time width T2 corresponds to the first gray-scale value, that is, T1+T2=Ts1.

In other embodiments, the first level signal and the second level signal may also correspondingly use the high level and the low level to replace judgment of logic 1 and logic 0. In some embodiments, the first level signal and the second level signal may be converted into a digital signal 1 or a digital signal 0, so as to enable the driving assembly to make corresponding logical judgment based on the digital signal. In addition, the first level signal and the second level signal may also be correspondingly transmitted by the control unit of the driving assembly to a driving unit of the driving assembly, so that the driving unit may correspondingly transmit the first scanning signal, a subsequent second scanning signal, and the data signal, which is not limited herein.

At block S34, the second scanning signal is transmitted to the next row of pixels of the display panel.

At block S35, based on the first gray-scale value, the data signal is transmitted to the display panel, and the display panel is driven to display the video signal.

The block S34 and the block S35 are the same as the block S13 and the block S14 shown in FIG. 1, respectively, which may refer to the blocks S13 and S14 and the relevant description above, and will not be repeated herein.

Figure 9:
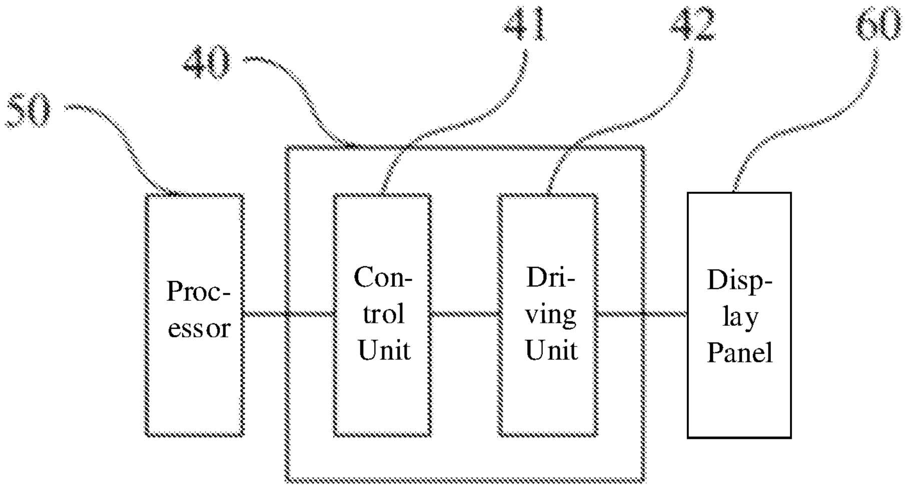
FIG. 9 is a structural schematic view of a driving device of a display panel according to a first embodiment of the present disclosure.

A driving device of a display panel is further provided in some embodiments of the present disclosure. As shown in FIG. 9, FIG. 9 is a structural schematic view of a driving device of a display panel according to a first embodiment of the present disclosure. In the embodiment, a display panel 60 includes a plurality of pixels arranged in an array, and a driving device 40 includes a control unit 41 and a driving unit 42.

The control unit 41 is coupled to an external processor 50 and configured to receive the video signal transmitted by the external processor 50. The control unit 41 is configured to generate a first control signal in response to the first gray-scale value of the each of the current row of pixels of the display panel 60 corresponding to the video signal being greater than the preset gray-scale value.

In some embodiments, the driving unit 42 is coupled to the control unit 41 and the external display panel 60, such that when receiving the first control signal and the first gray-scale value transmitted by the control unit 41, the driving unit 42 is configured to transmit the first scanning signal to the current row of pixels based on the first control signal and transmit the second scanning signal to the next row of pixels of the display panel 60. In addition, based on the first gray-scale value, the control unit 41 may be configured to transmit the data signal to the display panel 60, and drive the display panel 60 to display the video signal.

The first scanning signal is a high level in the current-row scanning period and has a high level with the first time width in the next-row scanning period. The second scanning signal is a high level in the next-row scanning period, and the data signal has a low level with the second time width in the current-row scanning period. A sum of the first time width and the second time width corresponds to the first gray-scale value.

In an embodiment, when the control unit 41 determines that the second gray-scale value of the each of the next row of pixels corresponding to the video signal is greater than the preset gray-scale value, the control unit 41 may further generate a second control signal correspondingly, so as to transmit the second control signal and the second gray-scale value to the driving unit 42. In this way, based on the second control signal, it may be possible to make the driving unit 42 transmit the first scanning signal to the current row of pixels, so as to transmit the second scanning signal to the next row of pixels. In addition, based on the first gray-scale value and the second gray-scale value, the driving unit 42 may transmit the data signal to the display panel 60 and drive the display panel 60 to display the video signal.

The second scanning signal further has a high level with the third time width in the current-row scanning period, and the data signal has a low level with the fourth time width in the next-row scanning period. The third time width is less than the second time width, and the sum of the third time width plus the fourth time width corresponds to the second gray-scale value.

In an embodiment, when the driving unit 42 receives the first gray-scale value transmitted by the control unit 41, the driving method further includes: generating a PWM signal based on the first gray-scale value, and transmitting the data signal to the display panel according to the PWM signal.

In some embodiments, the first time width is a time width corresponding to or for a gray-scale value of 1.

It should be understood that, the driving device 40 provided in the embodiment may also implement other methods, such as the driving method of the display panel 60 according to any one of above-mentioned embodiments, according to the gray-scale value information of each row of pixels of the display panel 60 corresponding to the video signal. For details, please refer to FIG. 1 to FIG. 8 and the relevant description above, which will not be repeated herein.

Figure 10:
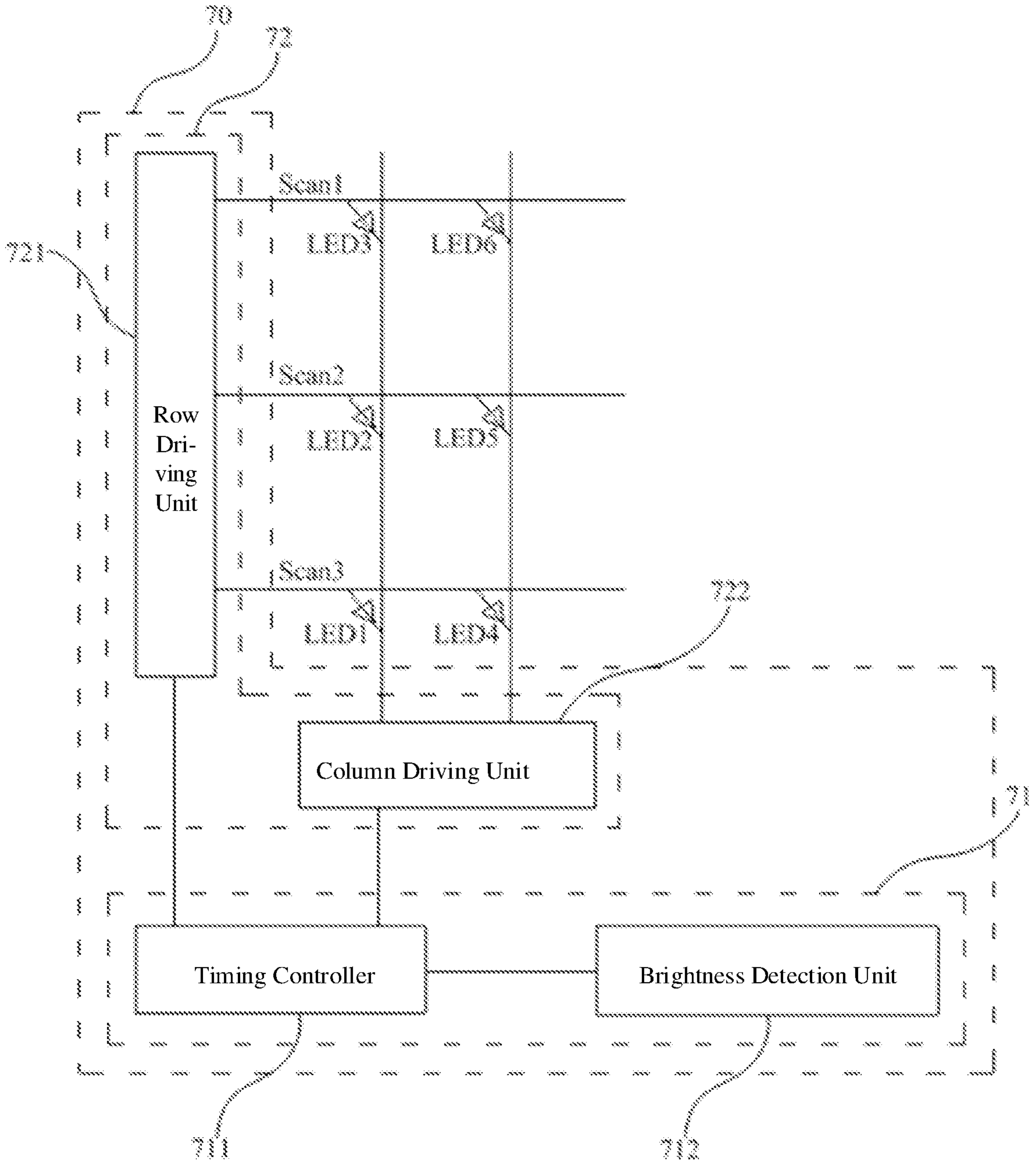
FIG. 10 is a structural schematic view of the driving device of the display panel according to a second embodiment of the present disclosure.

As further shown in FIG. 10, FIG. 10 is a structural schematic view of the driving device of the display panel according to a second embodiment of the present disclosure. A difference between the driving device of the display panel provided in the second embodiment and the driving device of the display panel provided in the first embodiments shown in FIG. 9 is that, the control unit 71 of the driving device 70 further includes a timing controller 711 and a brightness detection unit 712 which are coupled to each other, and the driving unit 42 further includes a row driving unit 421 and a column driving unit 422 that are coupled to the timing controller 711.

The brightness detection unit 712 is coupled to the processor, so as to receive the video signal transmitted by the processor. In addition, the brightness detection unit 712 is configured to transmit the first level signal to the timing controller 711 when the brightness detection unit 712 detects that the gray scale corresponding to the video signal is not 0. After receiving the first level signal, the timing controller 711 transmits the second level signal and the third level signal to the row driving unit 421 and the column driving unit 422, respectively. In this way, the row driving unit 421 transmits the first scanning signal to the current row of pixels of the display panel, transmits the second scanning signal to the next row of pixels of the display panel, and makes the column driving unit 422 transmit the data signal to the display panel.

It should be noted that, in the embodiment, the first level signal is a level signal of logic 0 or a low level signal. The second level signal and the third level signal are level signals of logic 1 or high level signals.

Figure 11:
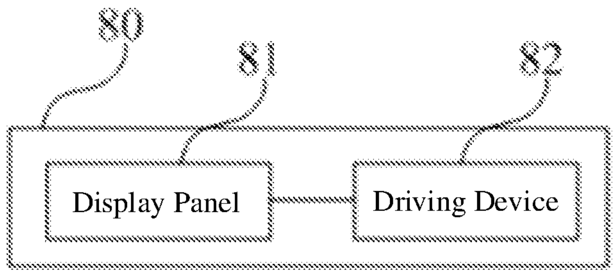
FIG. 11 is a structural schematic view of a display device according to an embodiment of the present disclosure.

As shown in FIG. 11, FIG. 11 is a structural schematic view of a display device according to an embodiment of the present disclosure.

In the embodiment, the display device 80 includes a display panel 81 and a driving device 82. The driving device 82 is coupled to the display panel 81, and is configured to drive the light-emitting unit of the display panel 81 to emit light.

It should be noted that, the driving device 82 is the driving device 40 or the driving device 70 according to any one of above-mentioned embodiments, which will not be repeated here.

Different from the related art, the following technical effects of some embodiments of the present disclosure may be achieved. In the driving method provided in some embodiments of the present disclosure, when the video signal transmitted by the external processor is received, the first scanning signal may be transmitted to the current row of pixels in response to the first gray-scale value of the each of the current row of pixels of the display panel corresponding to the video signal being greater than the preset gray-scale value. In addition, the second scanning signal may be transmitted to the next row of pixels of the display panel, and based on the first gray-scale value, the data signal may be transmitted to the display panel, and the display panel is driven to display the video signal. The first scanning signal is the high level in the current-row scanning period and has the high level with the first time width in the next-row scanning period. The second scanning signal is the high level in the next-row scanning period, the data signal has the low level with the second time width in the current-row scanning period, and the sum of the first time width and the second time width corresponds to the first gray-scale value. In this way, the gray-scale modulation pulse width corresponding to the data signal is divided into the two parts, and a corresponding pixel corresponding to the current-row scanning period and a corresponding pixel corresponding to the next-row scanning period are lighted up, respectively. Therefore, the high gray scale may be effectively improved, that is, the high gray scale is larger than the refresh rate in the display scenario with the preset gray-scale value, thereby effectively improving the high gray scale of the display image quality.

According to a first aspect of the embodiments of the present disclosure, a driving method of a display panel is provided. The display panel includes a plurality of pixels arranged in an array. The driving method includes: receiving a video signal transmitted by an external processor; transmitting a first scanning signal to a current row of pixels in response to a first gray-scale value of each of the current row of pixels of the display panel corresponding to the video signal being greater than a preset gray-scale value; transmitting a second scanning signal to a next row of pixels of the display panel; and transmitting, based on the first gray-scale value, a data signal to the display panel and driving the display panel to display the video signal. The first scanning signal is a high level in a current-row scanning period and has a high level with a first time width in a next-row scanning period, the second scanning signal is a high level in the next-row scanning period, the data signal has a low level with a second time width in the current-row scanning period, and a sum of the first time width and the second time width corresponds to the first gray-scale value.

In some embodiments, the transmitting a second scanning signal to a next row of pixels of the display panel includes: transmitting the second scanning signal to the next row of pixels in response to a second gray-scale value of each of the next row of pixels corresponding to the video signal being greater than the preset gray-scale value; and the transmitting, based on the first gray-scale value, a data signal to the display panel and driving the display panel to display the video signal includes: transmitting, based on the first gray-scale value and the second gray-scale value, the data signal to the display panel and driving the display panel to display the video signal. The second scanning signal further has a high level with a third time width in the current-row scanning period, the data signal has a low level with a fourth time width in the next-row scanning period, the third time width is less than the second time width, and a sum of the third time width and the fourth time width corresponds to the second gray-scale value.

In some embodiments, the first time width is less than the fourth time width.

In some embodiments, the second time width corresponds to the first gray-scale value.

In some embodiments, after the transmitting the second scanning signal to the next row of pixels in response to a second gray-scale value of each of the next row of pixels corresponding to the video signal being greater than the preset gray-scale value, and before the transmitting, based on the first gray-scale value and the second gray-scale value, the data signal to the display panel and driving the display panel to display the video signal, the driving method further includes: transmitting a third scanning signal to a further next row of pixels of the display panel; the second scanning signal has a high level with a fifth time width in a further next-row scanning period, and a sum of the third time width, the fourth time width, and the fifth time width corresponds to the second gray-scale value.

In some embodiments, after the receiving a video signal transmitted by an external processor, and before the transmitting a first scanning signal to a current row of pixels in response to a first gray-scale value of each of the current row of pixels of the display panel corresponding to the video signal being greater than a preset gray-scale value, the driving method further includes: receiving a first level signal and a second level signal transmitted by the processor; the transmitting a first scanning signal to a current row of pixels in response to a first gray-scale value of each of the current row of pixels of the display panel corresponding to the video signal being greater than a preset gray-scale value, includes: transmitting the first scanning signal to the current row of pixels in response to neither the first level signal nor the second level signal being 0.

In some embodiments, the transmitting the first scanning signal to the current row of pixels in response to neither the first level signal nor the second level signal being 0, includes: determining that neither a digital signal corresponding to the first level signal nor a digital signal corresponding to the second level signal is 0, and transmitting the first scanning signal to the current row of pixels, in response to neither the first level signal nor the second level signal being a high level.

In some embodiments, after the receiving a video signal transmitted by an external processor, and before the transmitting a first scanning signal to a current row of pixels in response to a first gray-scale value of each of the current row of pixels of the display panel corresponding to the video signal being greater than a preset gray-scale value, the driving method further includes: analyzing the video signal and obtaining the first gray-scale value of each of the current row of pixels of the display panel corresponding to the video signal.

In some embodiments, the transmitting, based on the first gray-scale value, a data signal to the display panel and driving the display panel to display the video signal, includes: generating a pulse width modulation signal based on the first gray-scale value; transmitting the data signal to the display panel according to the PWM signal and driving the display panel to display the video signal.

In some embodiments, the transmitting, based on the first gray-scale value, a data signal to the display panel and driving the display panel to display the video signal, includes: receiving a pulse width modulation signal transmitted by the processor; and transmitting the data signal to the display panel according to the PWM signal and driving the display panel to display the video signal.

In some embodiments, the transmitting the data signal to the display panel according to the PWM signal and driving the display panel to display the video signal, includes: determining a transmission mode of a high level state and a low level state of the data signal according to the PWM signal, transmitting the data signal to the display panel based on the transmission mode, and driving the display panel to display the video signal.

In some embodiments, the first time width is less than a pulse width of the PWM signal.

In some embodiments, the first time width is a time width for a gray-scale value of 1.

In some embodiments, the preset gray-scale value is 32 or 64.

According to a second aspect of the embodiments of the present disclosure, a driving device of a display panel is provided. The display panel includes a plurality of pixels arranged in an array. The driving device includes: a control unit, coupled to an external processor, and configured to receive a video signal transmitted by the external processor and generate a first control signal in response to a first gray-scale value of each of a current row of pixels of the display panel corresponding to the video signal being greater than a preset gray-scale value; and a driving unit, coupled to the control unit and an external display panel, and configured to receive the first control signal and the first gray-scale value transmitted by the control unit, transmit, based on the first control signal, a first scanning signal to the current row of pixels, transmit the second scanning signal to a next row of pixels of the display panel, and transmit, based on the first gray-scale value, a data signal to the display panel and drive the display panel to display the video signal; the first scanning signal is a high level in a current-row scanning period and has a high level with a first time width in a next-row scanning period, the second scanning signal is a high level in the next-row scanning period, the data signal has a low level with a second time width in the current-row scanning period, and a sum of the first time width and the second time width corresponds to the first gray-scale value.

In some embodiments, the control unit is configured to generate a second control signal in response to the control unit determining that a second gray-scale value of each of the next row of pixels corresponding to the video signal is greater than the preset gray-scale value, and transmit the second control signal and the second gray-scale value to the driving unit; based on the second control signal, the driving unit is configured to transmit the first scanning signal to the current row of pixels, and transmit a second scanning signal to the next row of pixels; and based on the first gray-scale value and the second gray-scale value, the driving unit is configured to transmit the data signal to the display panel and drive the display panel to display the video signal; the second scanning signal further has a high level with a third time width in the current-row scanning period, the data signal has a low level with a fourth time width in the next-row scanning period, the third time width is less than the second time width, and a sum of the third time width and the fourth time width corresponds to the second gray-scale value.

In some embodiments, in response to the driving unit receiving the first gray-scale value transmitted by the control unit, the driving unit is configured to generate a pulse width modulation signal based on the first gray-scale value, and transmit the data signal to the display panel according to the PWM signal.

In some embodiments, the control unit further includes a timing controller and a brightness detection unit coupled to each other, and the driving unit further includes a row driving unit coupled to the timing controller and a column driving unit coupled to the timing controller; the brightness detection unit is coupled to the processor, and configured to receive the video signal transmitted by the processor, and transmit a first level signal to the timing controller in response to the brightness detection unit detecting that the gray scale corresponding to the video signal is not 0; after receiving the first level signal, the timing controller is configured to transmit a second level signal and a third level signal to the row driving unit and the column driving unit, respectively, and the row driving unit is configured to transmit the first scanning signal to the current row of pixels of the display panel, transmit the second scanning signal to the next row of pixels of the display panel, and drive the column driving unit to transmit the data signal to the display panel.

In some embodiments, the first time width is a time width for a gray-scale value of 1.

According to a third aspect of the embodiments of the present disclosure, a display device is provided. The display device includes a display panel, including a plurality of pixels arranged in an array; and a driving device, coupled to the display panel and configured to drive a light-emitting unit of the display panel to emit light; the driving device includes: a control unit, coupled to an external processor, and configured to receive a video signal transmitted by the external processor and generate a first control signal in response to a first gray-scale value of each of a current row of pixels of the display panel corresponding to the video signal being greater than a preset gray-scale value; and a driving unit, coupled to the control unit and an external display panel, and configured to receive the first control signal and the first gray-scale value transmitted by the control unit, transmit, based on the first control signal, a first scanning signal to the current row of pixels, transmit the second scanning signal to a next row of pixels of the display panel, and transmit, based on the first gray-scale value, a data signal to the display panel and drive the display panel to display the video signal. The first scanning signal is a high level in a current-row scanning period and has a high level with a first time width in a next-row scanning period, the second scanning signal is a high level in the next-row scanning period, the data signal has a low level with a second time width in the current-row scanning period, and a sum of the first time width and the second time width corresponds to the first gray-scale value.

The above description shows only embodiments of the present disclosure and does not limit the scope of the present disclosure. Any equivalent structure or equivalent process transformation performed based on the description and the accompanying drawings of the present disclosure, applied directly or indirectly in other related fields, shall be equally covered by the scope of the present disclosure.

What is claimed is:

1. A driving method of a display panel, the display panel comprising a plurality of pixels arranged in an array, and the driving method comprising:

receiving a video signal transmitted by an external processor;

transmitting a first scanning signal to a current row of pixels in response to a first gray-scale value of each of the current row of pixels of the display panel corresponding to the video signal being greater than a preset gray-scale value;

transmitting a second scanning signal to a next row of pixels of the display panel; and transmitting, based on the first gray-scale value, a data signal to the display panel and driving the display panel to display the video signal;

wherein the first scanning signal is a high level in a current-row scanning period and has a high level with a first time width in a next-row scanning period, the second scanning signal is a high level in the next-row scanning period, the data signal has a low level with a second time width in the current-row scanning period, and a sum of the first time width and the second time width corresponds to the first gray-scale value.

2. The driving method as claimed in claim 1, wherein the transmitting a second scanning signal to a next row of pixels of the display panel comprises:

transmitting the second scanning signal to the next row of pixels in response to a second gray-scale value of each of the next row of pixels corresponding to the video signal being greater than the preset gray-scale value; and wherein the transmitting, based on the first gray-scale value, a data signal to the display panel and driving the display panel to display the video signal comprises:

transmitting, based on the first gray-scale value and the second gray-scale value, the data signal to the display panel and driving the display panel to display the video signal;

wherein the second scanning signal further has a high level with a third time width in the current-row scanning period, the data signal has a low level with a fourth time width in the next-row scanning period, the third time width is less than the second time width, and a sum of the third time width and the fourth time width corresponds to the second gray-scale value.

3. The driving method as claimed in claim 2, wherein the first time width is less than the fourth time width.

4. The driving method as claimed in claim 2, wherein the second time width corresponds to the first gray-scale value.

5. The driving method as claimed in claim 2, wherein after transmitting the second scanning signal to the next row of pixels in response to a second gray-scale value of each of the next row of pixels corresponding to the video signal being greater than the preset gray-scale value, and before transmitting, based on the first gray-scale value and the second gray-scale value, the data signal to the display panel and driving the display panel to display the video signal, the driving method further comprises:

transmitting a third scanning signal to a further next row of pixels of the display panel;

wherein the second scanning signal has a high level with a fifth time width in a further next-row scanning period, and a sum of the third time width, the fourth time width, and the fifth time width corresponds to the second gray-scale value.

6. The driving method as claimed in claim 1, wherein after the receiving a video signal transmitted by an external processor, and before the transmitting a first scanning signal to a current row of pixels in response to a first gray-scale value of each of the current row of pixels of the display panel corresponding to the video signal being greater than a preset gray-scale value, the driving method further comprises:

receiving a first level signal and a second level signal transmitted by the processor;

the transmitting a first scanning signal to a current row of pixels in response to a first gray-scale value of each of the current row of pixels of the display panel corresponding to the video signal being greater than a preset gray-scale value, comprises:

transmitting the first scanning signal to the current row of pixels in response to neither the first level signal nor the second level signal being 0.

7. The driving method as claimed in claim 1, wherein the transmitting the first scanning signal to the current row of pixels in response to neither the first level signal nor the second level signal being 0, comprises:

determining that neither a digital signal corresponding to the first level signal nor a digital signal corresponding to the second level signal is 0, and transmitting the first scanning signal to the current row of pixels, in response to neither the first level signal nor the second level signal being a high level.

8. The driving method as claimed in claim 1, wherein after the receiving a video signal transmitted by an external processor, and before the transmitting a first scanning signal to a current row of pixels in response to a first gray-scale value of each of the current row of pixels of the display panel corresponding to the video signal being greater than a preset gray-scale value, the driving method further comprises:

analyzing the video signal and obtaining the first gray-scale value of each of the current row of pixels of the display panel corresponding to the video signal.

9. The driving method as claimed in claim 1, wherein the transmitting, based on the first gray-scale value, a data signal to the display panel and driving the display panel to display the video signal, comprises:

generating a pulse width modulation signal based on the first gray-scale value;

transmitting the data signal to the display panel according to the PWM signal and driving the display panel to display the video signal.

10. The driving method as claimed in claim 9, wherein the transmitting the data signal to the display panel according to the PWM signal and driving the display panel to display the video signal, comprises:

determining a transmission mode of a high level state and a low level state of the data signal according to the PWM signal, transmitting the data signal to the display panel based on the transmission mode, and driving the display panel to display the video signal.

11. The driving method as claimed in claim 1, wherein the transmitting, based on the first gray-scale value, a data signal to the display panel and driving the display panel to display the video signal, comprises:

receiving a pulse width modulation signal transmitted by the processor; and transmitting the data signal to the display panel according to the PWM signal and driving the display panel to display the video signal.

12. The driving method as claimed in claim 11, wherein the first time width is less than a pulse width of the PWM signal.

13. The driving method according to claim 1, wherein the first time width is a time width for a gray-scale value of 1.

14. The driving method according to claim 1, wherein the preset gray-scale value is 32 or 64.

15. A driving device of a display panel, the display panel comprising a plurality of pixels arranged in an array, and the driving device comprising:

a control unit, coupled to an external processor, and configured to receive a video signal transmitted by the external processor and generate a first control signal in response to a first gray-scale value of each of a current row of pixels of the display panel corresponding to the video signal being greater than a preset gray-scale value; and a driving unit, coupled to the control unit and an external display panel, and configured to receive the first control signal and the first gray-scale value transmitted by the control unit, transmit, based on the first control signal, a first scanning signal to the current row of pixels, transmit the second scanning signal to a next row of pixels of the display panel, and transmit, based on the first gray-scale value, a data signal to the display panel and drive the display panel to display the video signal;

wherein the first scanning signal is a high level in a current-row scanning period and has a high level with a first time width in a next-row scanning period, the second scanning signal is a high level in the next-row scanning period, the data signal has a low level with a second time width in the current-row scanning period, and a sum of the first time width and the second time width corresponds to the first gray-scale value.

16. The driving device as claimed in claim 15, wherein the control unit is configured to generate a second control signal in response to the control unit determining that a second gray-scale value of each of the next row of pixels corresponding to the video signal is greater than the preset gray-scale value, and transmit the second control signal and the second gray-scale value to the driving unit;

based on the second control signal, the driving unit is configured to transmit the first scanning signal to the current row of pixels, and transmit a second scanning signal to the next row of pixels; and based on the first gray-scale value and the second gray-scale value, the driving unit is configured to transmit the data signal to the display panel and drive the display panel to display the video signal;

wherein the second scanning signal further has a high level with a third time width in the current-row scanning period, the data signal has a low level with a fourth time width in the next-row scanning period, the third time width is less than the second time width, and a sum of the third time width and the fourth time width corresponds to the second gray-scale value.

17. The driving device as claimed in claim 15, wherein in response to the driving unit receiving the first gray-scale value transmitted by the control unit, the driving unit is configured to generate a pulse width modulation signal based on the first gray-scale value, and transmit the data signal to the display panel according to the PWM signal.

18. The driving device as claimed in claim 15, wherein the control unit further comprises a timing controller and a brightness detection unit coupled to each other, and the driving unit further comprises a row driving unit coupled to the timing controller and a column driving unit coupled to the timing controller;

the brightness detection unit is coupled to the processor, and configured to receive the video signal transmitted by the processor, and transmit a first level signal to the timing controller in response to the brightness detection unit detecting that the gray scale corresponding to the video signal is not 0;

after receiving the first level signal, the timing controller is configured to transmit a second level signal and a third level signal to the row driving unit and the column driving unit, respectively, and the row driving unit is configured to transmit the first scanning signal to the current row of pixels of the display panel, transmit the second scanning signal to the next row of pixels of the display panel, and drive the column driving unit to transmit the data signal to the display panel.

19. The driving device according to claim 15, wherein the first time width is a time width for a gray-scale value of 1.

20. A display device, comprising:

a display panel, comprising a plurality of pixels arranged in an array; and a driving device, coupled to the display panel and configured to drive a light-emitting unit of the display panel to emit light;

wherein the driving device comprises:

a control unit, coupled to an external processor, and configured to receive a video signal transmitted by the external processor and generate a first control signal in response to a first gray-scale value of each of a current row of pixels of the display panel corresponding to the video signal being greater than a preset gray-scale value; and a driving unit, coupled to the control unit and an external display panel, and configured to receive the first control signal and the first gray-scale value transmitted by the control unit, transmit, based on the first control signal, a first scanning signal to the current row of pixels, transmit the second scanning signal to a next row of pixels of the display panel, and transmit, based on the first gray-scale value, a data signal to the display panel and drive the display panel to display the video signal;

wherein the first scanning signal is a high level in a current-row scanning period and has a high level with a first time width in a next-row scanning period, the second scanning signal is a high level in the next-row scanning period, the data signal has a low level with a second time width in the current-row scanning period, and a sum of the first time width and the second time width corresponds to the first gray-scale value.

* * * * *